United States Patent
Braun et al.

(10) Patent No.: US 11,067,188 B2
(45) Date of Patent: Jul. 20, 2021

(54) ELECTROMAGNETIC PRESSURE CONTROL VALVE

(71) Applicant: ECO Holding 1 GmbH, Marktheidenfeld (DE)

(72) Inventors: Manuel Braun, Nuertingen (DE); Viktor Unruh, Steinhagen (DE); Eike Winzer, Nuertingen (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 3 days.

(21) Appl. No.: 16/397,169

(22) Filed: Apr. 29, 2019

(65) Prior Publication Data
US 2020/0041022 A1    Feb. 6, 2020

(30) Foreign Application Priority Data

Aug. 1, 2018  (DE) .......................... 102018118668.1

(51) Int. Cl.
*F16K 31/06*   (2006.01)
*F16K 11/07*   (2006.01)
*F16H 61/02*   (2006.01)

(52) U.S. Cl.
CPC ...... *F16K 31/0613* (2013.01); *F16K 31/0696* (2013.01); *F16H 2061/0253* (2013.01); *F16K 11/07* (2013.01)

(58) Field of Classification Search
CPC ............ F16K 31/0613; F16K 31/0696; F16K 31/0603; F16K 47/00; F16K 11/07; F16K 11/065; F16K 31/06; F16H 2061/0253; F15B 13/0407; F15B 13/0402

USPC .................................................... 137/625.25
See application file for complete search history.

(56) References Cited

U.S. PATENT DOCUMENTS

| | | | | |
|---|---|---|---|---|
| 5,339,777 | A * | 8/1994 | Cannon ..................... | F01L 9/02 123/90.11 |
| 6,364,280 | B1 * | 4/2002 | Stach ................... | F15B 13/0402 137/625.69 |
| 6,609,538 | B2 * | 8/2003 | Royle ................... | B60T 8/3665 137/625.65 |
| 6,802,330 | B2 * | 10/2004 | Royle ................... | B60T 8/3665 137/12 |

(Continued)

FOREIGN PATENT DOCUMENTS

| | | |
|---|---|---|
| DE | 10241449 A1 | 3/2004 |
| EP | 1762765 A2 | 3/2007 |

*Primary Examiner* — Craig J Price
*Assistant Examiner* — Andrew J Rost
(74) *Attorney, Agent, or Firm* — Von Rohrscheidt Patents

(57) ABSTRACT

An electromagnetic pressure control valve including an electromagnetic actuator configured to position a piston that is received axially movable in a receiving opening of a valve housing of the electromagnetic pressure control valve, wherein the piston facilitates opening and closing flow connections of the electromagnetic pressure control valve, wherein the piston receives a pin at a piston face that is oriented away from the electromagnetic actuator, wherein a relative movement is enabled between the pin and the piston, wherein the pin includes a pin face that is arranged in the valve housing and oriented away from the piston and arranged opposite to a stop, and wherein the pin is fixed at the stop so that a movement of the pin in a direction towards the stop is eliminated.

12 Claims, 5 Drawing Sheets

(56) References Cited

U.S. PATENT DOCUMENTS

| | | | |
|---|---|---|---|
| 6,948,514 B1* | 9/2005 | Kramer | F16K 31/0613 137/15.21 |
| 9,297,474 B2* | 3/2016 | Suzuki | F16K 31/0675 |
| 2007/0056644 A1* | 3/2007 | Boddy | F16K 31/061 137/625.65 |
| 2016/0017991 A1* | 1/2016 | Boban | F16K 11/07 137/625.18 |
| 2018/0112792 A1* | 4/2018 | Eisenberger | F16K 31/0696 |

* cited by examiner

ELECTROMAGNETIC PRESSURE CONTROL VALVE

RELATED APPLICATIONS

This application claims priority from and incorporates by reference German patent application DE 10 2018 118 668.1, filed on Aug. 1, 2018.

FIELD OF THE INVENTION

The invention relates to an electromagnetic pressure control valve according to the preamble of patent claim 1.

BACKGROUND OF THE INVENTION

Electromagnetic press control valves are known in the art. They are used, for example, for hydraulically controlling a clutch of an automatic transmission of a motor vehicle. The pressure control valves include a piston that is axially movable in a controller housing and that is provided for opening and/or closing connections. The piston is moved axially by an electromagnetic actuator. In order to adapt an actuation force of the electromagnetic actuator, the pressure control valve includes a pin at a piston end that is oriented away from the electromagnetic actuator wherein the pin is also designated as a needle and received in a receiving opening of the piston. The pin contacts a wall of the controller housing that is arranged opposite to the piston end and forms a stop for the pin. The movement of the piston causes a relative movement between the piston and the pin. An electromagnetic pressure control valve of this type can be derived from the two publication documents, DE 102 41 449 A1 and EP 1 762 765 A2.

The axial movement of the piston changes a volume that is formed between the pin and the receiving opening which provides a damping of the piston movement since the volume is at least partially filled with hydraulic fluid. Thus, a force equilibrium can be provided at the piston. However, there are load conditions during operation of the pressure controller or pressure oscillations in the connections which cause a lifting of the pin from the wall when the magnet is loaded with current so that the piston is moved.

Also oscillations exclusively from the system can excite the pressure control valve negatively so that the pin lifts off from the wall.

It causes problem when the pin is subjected to a very high acceleration and impacts the wall. This, in turn, causes damages to the wall through fracture, or when the wall is inserted into the controller housing, it causes the wall to be jolted out of the controller housing which causes a failure of the pressure control valve.

BRIEF SUMMARY OF THE INVENTION

Thus, it is an object of the instant invention to provide an improved electromagnetic pressure control valve which eliminates the operational problems recited supra.

The object is achieved according to the invention by an electromagnetic pressure control valve including an electromagnetic actuator configured to position a piston that is received axially movable in a receiving opening of a valve housing of the electromagnetic pressure control valve, wherein the piston facilitates opening and closing flow connections of the electromagnetic pressure control valve, wherein the piston receives a pin at a piston face that is oriented away from the electromagnetic actuator, wherein a relative movement is enabled between the pin and the piston, wherein the pin includes a pin face that is arranged in the valve housing and oriented away from the piston and arranged opposite to a stop, and wherein the pin is fixed at the stop so that a movement of the pin in a direction towards the stop is eliminated.

Advantageous embodiments with useful and non-trivial improvements of the invention are provided in the respective dependent claims.

An electromagnetic pressure control valve according to the invention includes an electromagnetic actuator for positioning a piston that is received axially movable in a receiving opening of a controller housing. The piston facilitates opening and/or closing flow connections of the pressure control valve. The piston includes a pin at a face that is oriented away from the electromagnetic actuator, wherein a relative movement is caused between the pin and the piston. A face that is configured in the controller housing and oriented away from the piston is arranged opposite to a stop according to the invention. The pin is fixed at the stop in order to eliminate a movement of the pin in a direction towards the stop.

Lifting the pin from the stop could be prevented by preventing pressure increases and pressure spikes in a space between the stop and the piston. This, however, is not reliably implementable. By fixing the pin at the stop, an impact of the pin at the stop is reliably eliminated so that damages to the stop are prevented. This provides an improved electromagnetic pressure control valve with an increased service life.

In one embodiment of the pressure control valve according to the invention, the stop is configured as a cover element that closes the receiving opening. Thus, an economical pressure control valve can be produced since the receiving opening can be implemented in a cost-effective manner as a borehole. Furthermore, the pin and possibly also a reset element configured to reset the piston can be arranged in a simple manner in the receiving opening before mounting the cover in the receiving opening so that a cost effective assembly is provided.

In order to reset the piston, a preload element is arranged between the piston and the stop, wherein the preload element is also usable to provide a dampened movement of the piston towards the stop.

In a compact embodiment, the preload element, which is advantageously configured as a spiral spring, is configured so that it envelopes the pin.

A secured fixing of the pin at the stop is provided when the pin is configured integrally in one piece with the stop.

An alternative secured fixing is provided by pressing the pin into a receiving opening of the stop. Thus, the pin is also secured at the stop since an off-axis loading of the pin by the piston is excluded due to the support of the pin in the piston since the pin and the piston are advantageously coaxially arranged.

Advantageously the preload element is supported at the stop so that the preload is provided with a fixed contact at one end. Furthermore, it is possible when providing the stop as a cover element that closes the receiving opening to fix the preload element at the cover element before installing the preload element so that the preload element is secured against loss during assembly.

An economical electromagnetic pressure control valve can be provided by producing the pin and/or the stop from a synthetic material. In addition to low material cost, this also allows cost-effective production methods like deep drawing or injection molding.

In another advantageous embodiment of the pressure control valve according to the invention, a movement gap is provided between the piston and the pin wherein the movement gap flow connects a first volume formed in the piston with a second volume that is formed between the piston and the stop. Put differently, this means that the movement gap formed between the piston and the pin facilitates implementing a pressure relief of the second volume. This facilitates a quick movement of the piston in order to reliably implement the function of the pressure control valve.

A bevel at an outer circumference of a shoulder surface of the cover element configures the terminal element for simplified assembly. The bevel facilitates insertion of the terminal element into the controller housing.

By the same token, an additional bevel arranged at another section of the cover element facilitates arranging the preload element since the preload element can be arranged at the cover element with lower forces due to the additional bevel, in particular when a press fit is provided between the preload element and the cover element.

In another embodiment of the electromagnetic pressure control valve according to the invention the cover element is secured at the controller housing by at least one clamping element.

In order to secure the cover element at the controller housing through the clamping element, an element face that is oriented away from the piston is rounded. This has the advantage of simplified engagement of the clamping element in the cover element, in particular when the cover element includes a receiving opening at an element face that is oriented away from the piston.

BRIEF DESCRIPTION OF THE DRAWINGS

Further advantages, features and details of the invention can be derived from the subsequent description of advantageous embodiments and from the drawing figure. The features and feature combinations recited in the preceding description and recited in the subsequent figure description and/or features and feature combinations that are shown in the drawing figures are not only usable in the respectively stated combination but also in other combinations or by themselves without departing from the spirit and scope of the invention. Identical reference numerals are associated with identical or functionally equivalent elements. In order to provide clarity it is possible that the elements are not provided with reference numerals in all drawing figures without losing the association, wherein.

DETAILED DESCRIPTION OF THE INVENTION

Figure 1:
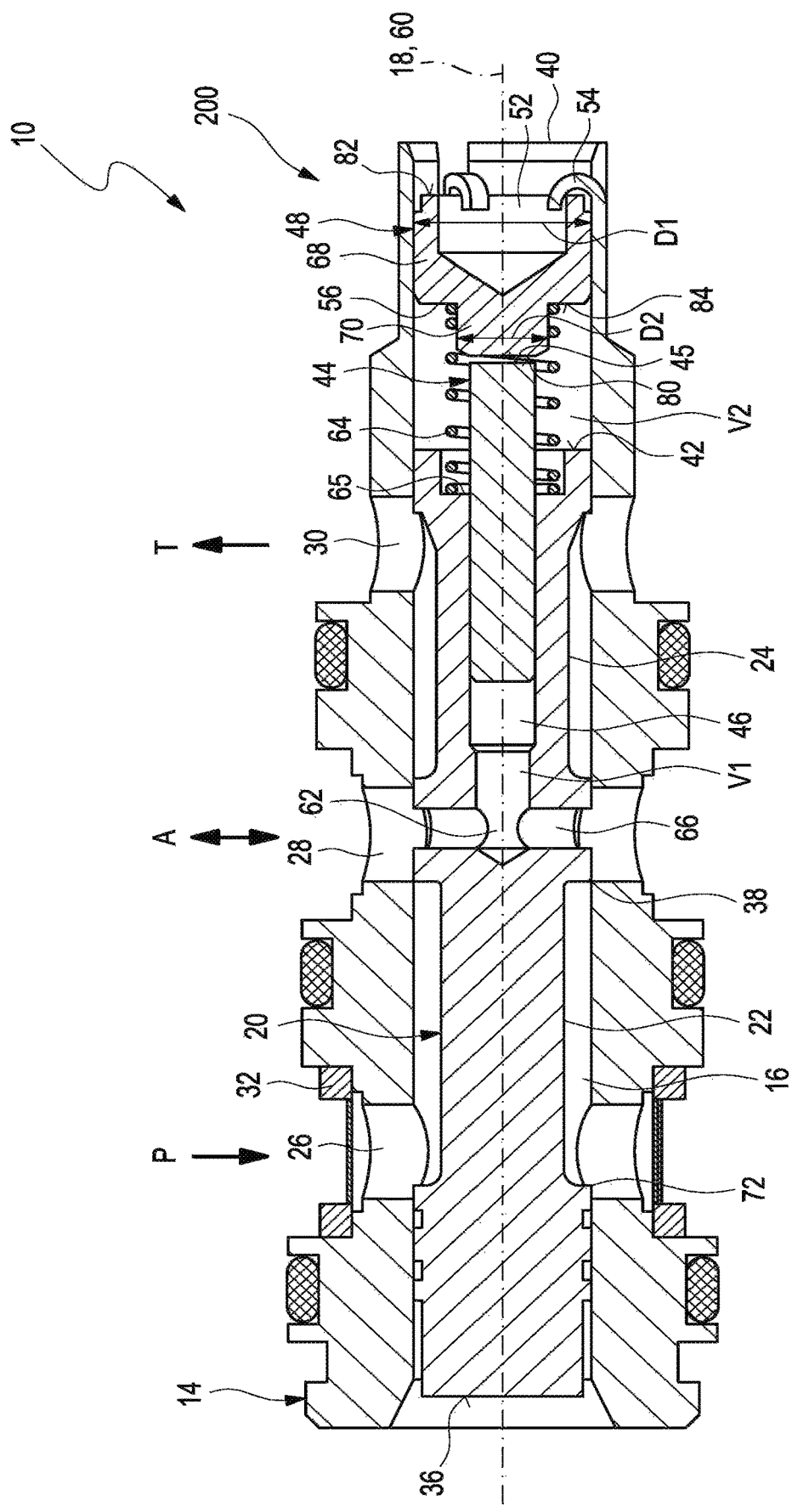
FIG. 1 illustrates a longitudinal sectional view of a prior art hydraulic unit of an electromagnetic pressure control valve in a first position.

A hydraulic unit 200 of a prior art electromagnetic pressure control valve 10 for a clutch of an automatic transmission of a motor vehicle that is not illustrated in detail is configured according to FIG. 1. The pressure control valve 10 is illustrated in FIG. 1 in a first position in which the electromagnetic actuator of the pressure control valve 10 that is not illustrated in detail is not loaded with electrical current.

The hydraulic unit 200 includes a controller housing 14 which is configured with hydraulic connections, thus a supply connection P, a consumer connection A and a tank connection T. A piston 20 is movably received in a first receiving opening 16 configured in the controller housing 14 so that the piston is axially movable along a longitudinal axis 18 of the controller housing 14. The controller housing 14 is configured rotationally symmetrical with respect to the longitudinal axis 18.

The piston 20 is configured to provide a controllable flow through of the hydraulic connections P, A, T. The piston includes two control grooves that are distributed over its circumference, a first control groove 22 and a second control groove 24. The first control groove 22 is configured to provide a flow connection between the supply connection P and the consumer connection A. The second control groove 24 is configured to provide a flow connection between the consumer connections A and the tank connection T.

In order to provide the flow connection the controller housing 14 includes flow through openings that are arranged in series along the longitudinal axis 18 and completely penetrate the controller housing 14, wherein a first flow through opening 26 is associated with the supply connection P, a second flow through opening 28 is associated with the consumer connection A, and a third flow through opening 30 is associated with the tank connection T. A filter screen 32 is received in the first flow through opening 26 wherein the filter screen facilitates filtering a hydraulic fluid that flows through the pressure control valve 10 and that is provided to the pressure control valve 10 through the supply connection P.

In order to position the piston 20 the electromagnetic actuator is provided with an axially movable plunger that is not illustrated in more detail and that assumes a particular axial position corresponding to a loading of the electromagnetic actuator with electrical current. The piston is operatively connected with the plunger so that the piston is moved when the plunger is moved.

In a second position of the pressure control valve 10 that is not illustrated in more detail the consumer connection A is loaded with the hydraulic fluid from the supply connection P. The piston 20 is then positioned by the plunger so that the first control groove 22 releases the first flow through opening 26 and the second flow through opening 28. The first control edge 38 of the first control groove 22 which is oriented towards the second flow through opening 28 is moved far enough axially in a direction towards a housing end 40 of the controller housing 14 that is oriented away from the electromagnetic actuator so that the second flow through opening 28 can be flowed through since a second control edge 72 of the first control groove 22 that is arranged opposite to the first control edge 38 is positioned so that the first flow through opening 26 is open.

The piston 20 includes a cylindrical pin 44 at a face 42 that is oriented towards the housing end 40 wherein the pin 44 is received in a second receiving opening 46 that is configured in the piston 20. The pin 44 is positioned in the second receiving opening 46, in particular movable relative to the piston 20 and coaxially supported relative to the piston 20 in the second receiving opening 46. Thus, the pin 44 is limited with respect to its movement in an axial direction away from the piston 20 by a cover element 48 that is arranged opposite to a face 45 of the pin. The pin 44 is accelerated as a function of pressure conditions at the pressure control valve 10. The cover element 48 is configured to provide a closure of the first receiving opening 16.

A variable first volume V1 is configured between the second receiving opening 46 and the pin 44, wherein the variable first volume facilitates damping the piston movement. In order to supply the first volume V1 with hydraulic fluid the piston 20 includes inlet openings 66 at an end portion 62 of the second receiving opening 46 that is arranged opposite to the pin 44. The inlet openings 66 are configured in the piston 20 so that a feeding and draining of the first volume V1 can be provided with hydraulic fluid through the consumer connection A. Overall two inlet openings 66 are arranged evenly distributed over a circumference of the piston 20. By the same token also more inlet openings 66 or only a single inlet opening 66 can be provided.

The pin 44 is supported at the rotation symmetrical cover element 48 that is configured as a stop at a first face 80 of the cover element that is oriented towards the pin. The cover element 48 includes a third receiving opening 52 at a second element face 82 that is oriented away from the first element face 80. The third receiving opening 52 is configured for weight reduction and to receive safety elements 54 configured as clamping elements.

The cover element 48 is configured semi-hollow cylindrical and includes a section 68 along a cover axis 60 that is configured coaxial with a longitudinal axis 18 wherein the section 68 has a diameter D1 and wherein the cover element has an additional section 70 with a second diameter D2, wherein the first diameter D1 is greater than the second diameter D2. The first diameter D1 essentially corresponds to an inner diameter D1 of the first receiving opening 16. Advantageously the first diameter D1 is configured to generate a press fit between the controller housing 14 and the cover element 48. An additional safety against disengagement of the cover element 48 is configured as clamping elements 54 which engage the third receiving opening 52 starting from the controller housing 14.

Due to the two diameters D1, D2 the cover element 48 includes a shoulder 56 with a shoulder surface 84. Between the shoulder 56 which is oriented towards the piston 20, the piston 20 and the controller housing 14 a compressible second volume V2 is configured. In order to provide a controlled movement of the piston along its travel path and in order to reset the piston 20 in a direction towards the electromagnetic actuator a preload element 64 is arranged between the piston 20 and the cover element 48 wherein the preload element is configured in this embodiment as a spiral spring. In order to relieve the second volume V2 the first volume V1 is flow connected with the second volume V2 by a movement gap that is configured between the piston 20 and the pin 44.

The preload element 64 is supported at one end at the shoulder 56 and at the other end at the piston 20. In order to provide safe positioning the preload element 64 is received at the other end in the second receiving opening 46 and supported there at an additional shoulder 65 which is configured in the piston 20.

In addition to supporting the preload element 64 the additional shoulder 65 limits the axial piston movement since the additional section 70 protrudes into the second receiving opening 46 and is contactable at the additional shoulder 65.

In order to facilitate quick assembly the cover element 48 includes a bevel 76 at the outer circumference of the shoulder surface 84 so that the cover element 48 can be inserted more easily. The second element face 82 is configured cambered towards the clamping elements 54 in order to receive the clamping elements 54 in a simple and reliable manner.

Figure 2:
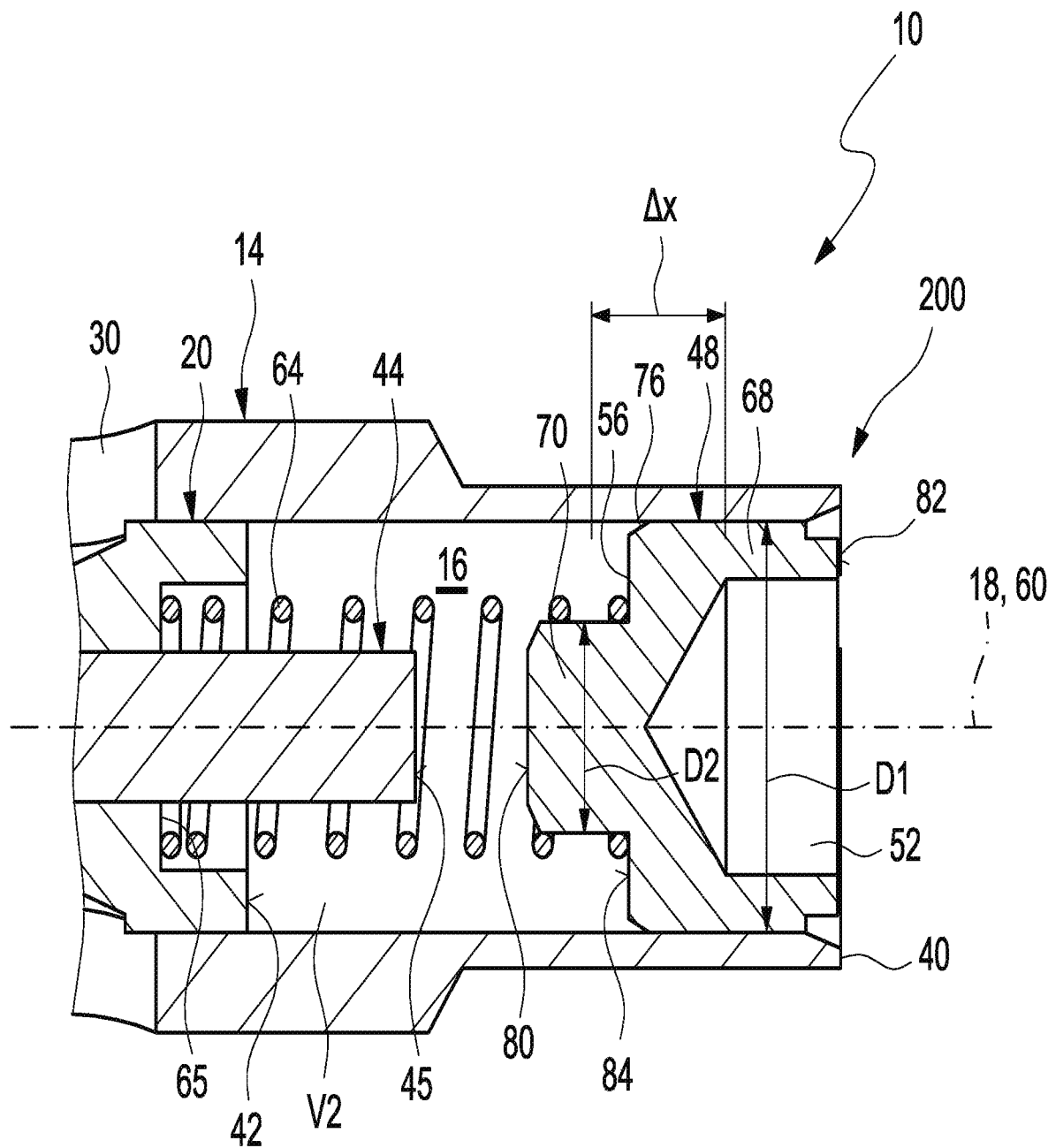
FIG. 2 illustrates a longitudinal sectional view of a detail of the hydraulic unit according to FIG. 1.

FIG. 2 showing in a blown up detail of the hydraulic unit 200 shows the cover element 48 in a default position in pressed out condition. This default position is displaced towards the housing end 40 compared to the original position, wherein a movement travel Δx is provided between the original position and the default position. Put differently this means that a wedging of the cover element 48 has been overcome.

Figure 3:
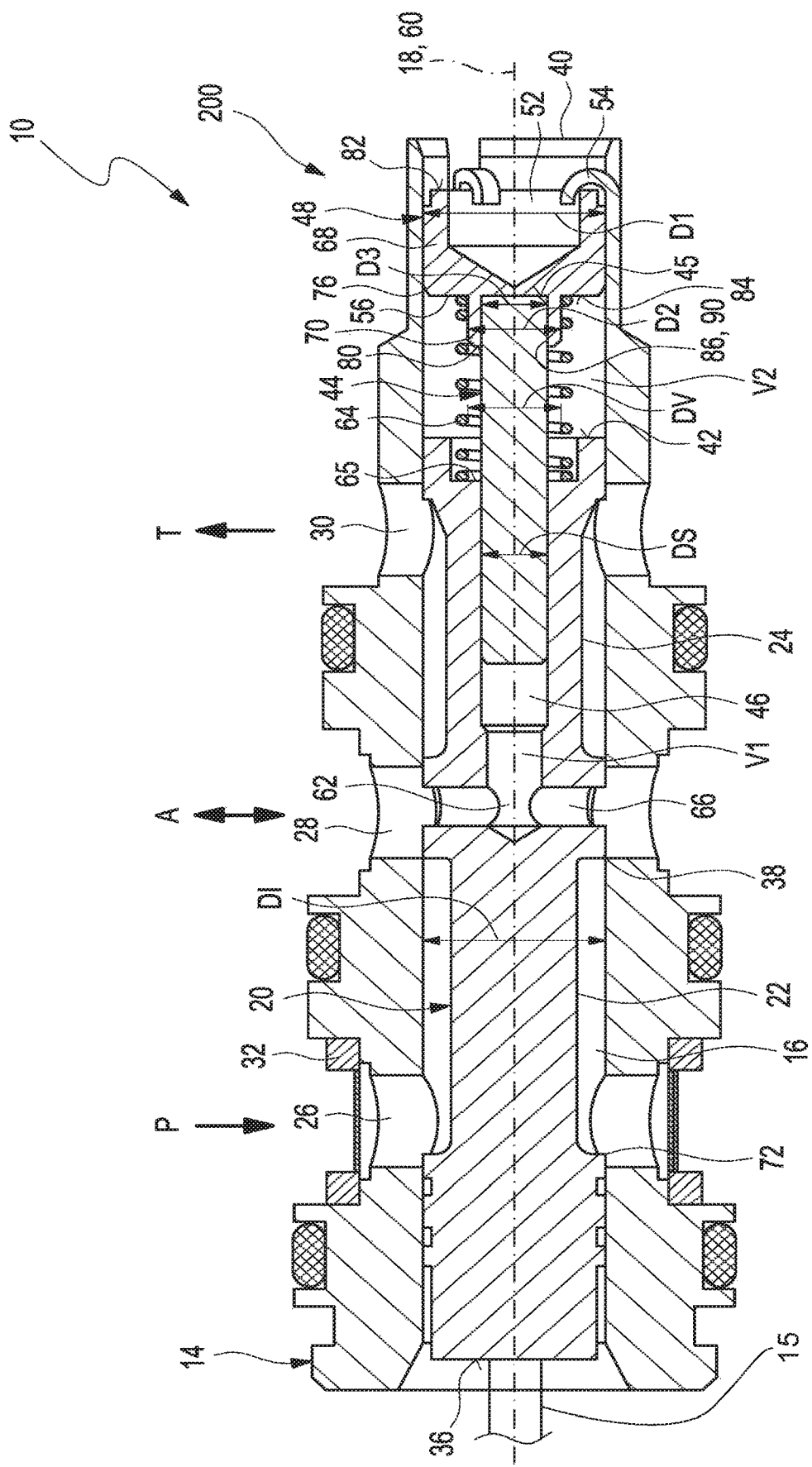
FIG. 3 illustrates a longitudinal sectional view of the hydraulic unit of a first embodiment of the electromagnetic pressure control valve according the invention.

The pressure control valve 10 according to the invention which is configured according to FIG. 3 is fixed at the cover element 48 in order to reliably prevent a contact of the pin 44. The piston 20 is axially driven by the electromagnetic actuator rod 15.

In order to reliably receive the pin 44 the cover element 48 includes a connection element 86 that is configured as a hollow cylinder at a first face 80 of the cover element wherein the hollow cylinder is integrally configured in one piece together with the cover element 48.

The connection element 86 envelops and receives the pin 44. The pin 44 is bonded to the connection element 86. In the illustrated embodiment the connection element 86 is configured by a receiving opening 90 in the additional section 70 wherein the receiving opening has a third diameter D3. This way existing cover elements 48 can be used in a modified manner. Advantageously the third diameter D3 is configured to provide a press fit between the pin 44 and the connection element 86.

The preload element 64 envelops the pin 44 and provides a reset of the piston 20 when the actuator is not provided with electrical current. A diameter DV of the preload element 64 facilitates that there is no contact with the pin 44. Put differently this means that a pin diameter DS has to be smaller than the diameter DV of the preload element 64. In order to fix the preload element 64 at the cover element 48 in order to prevent a disengagement from the cover element 48 the diameter DV has to be selected so that a press fit is provided. The press fit between the preload element 64 and the cover element 48 at its connection element 86 can be supported by a bonded connection of the preload element 64 at the cover element 48 in order to provide fixed reception.

In a non-illustrated embodiment the pin 44 is connected with the connection element 86 by a form locking and friction locking connection. For this purpose the connection element 86 includes an internal thread and the pin 44 includes a complementary external thread. The form locking and friction locking connection can be secured against disengagement by a bonded connection provided as a weld spot or a weld seam. It is appreciated that soldering can be generally used for a bonded connection instead of welding as a function of the selected materials of the cover element 48, the connection element 86 and the pin 44.

Figure 4:
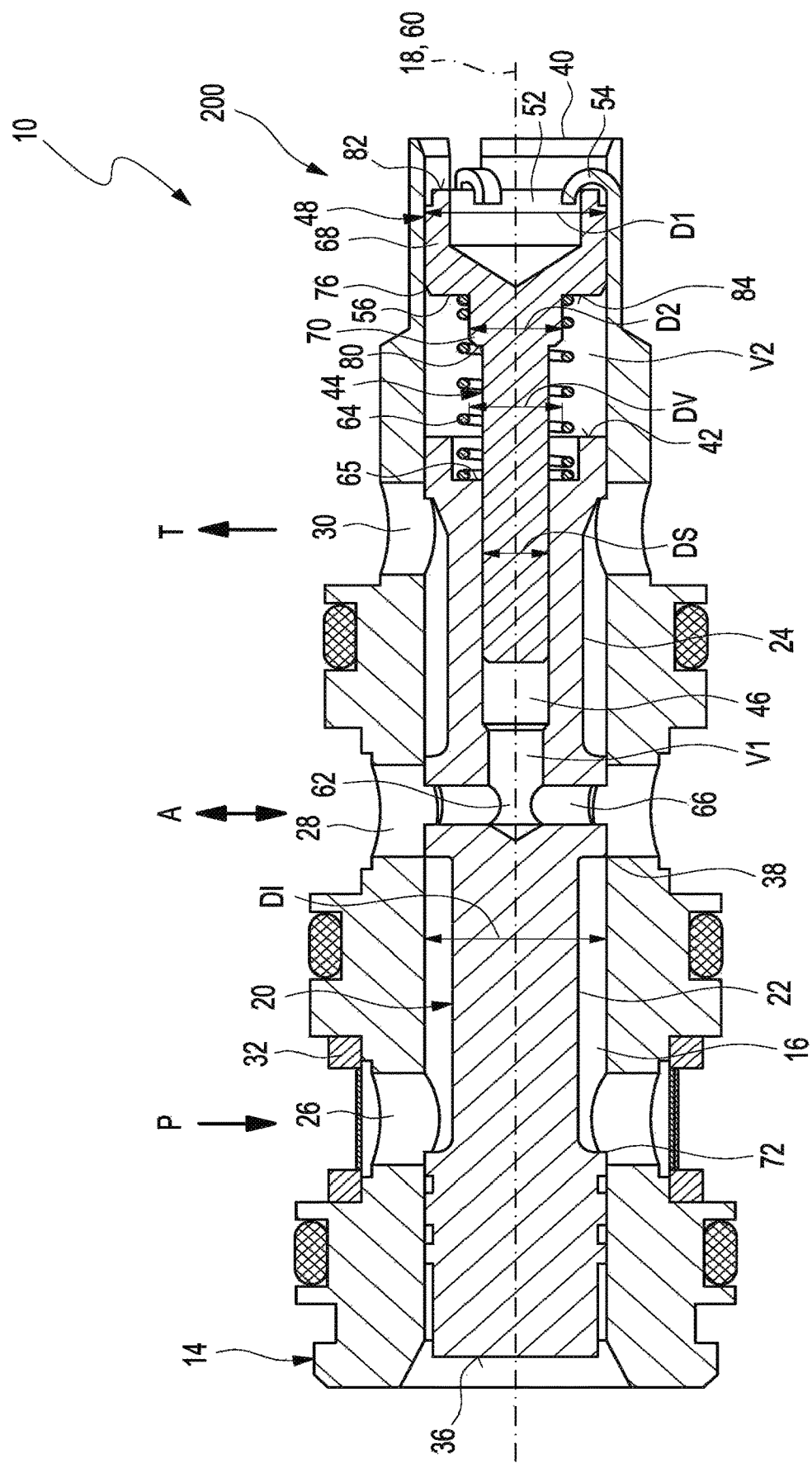
FIG. 4 illustrates a longitudinal sectional view of the hydraulic unit of the electromagnetic pressure control valve according to the invention in a second embodiment.
Figure 5:
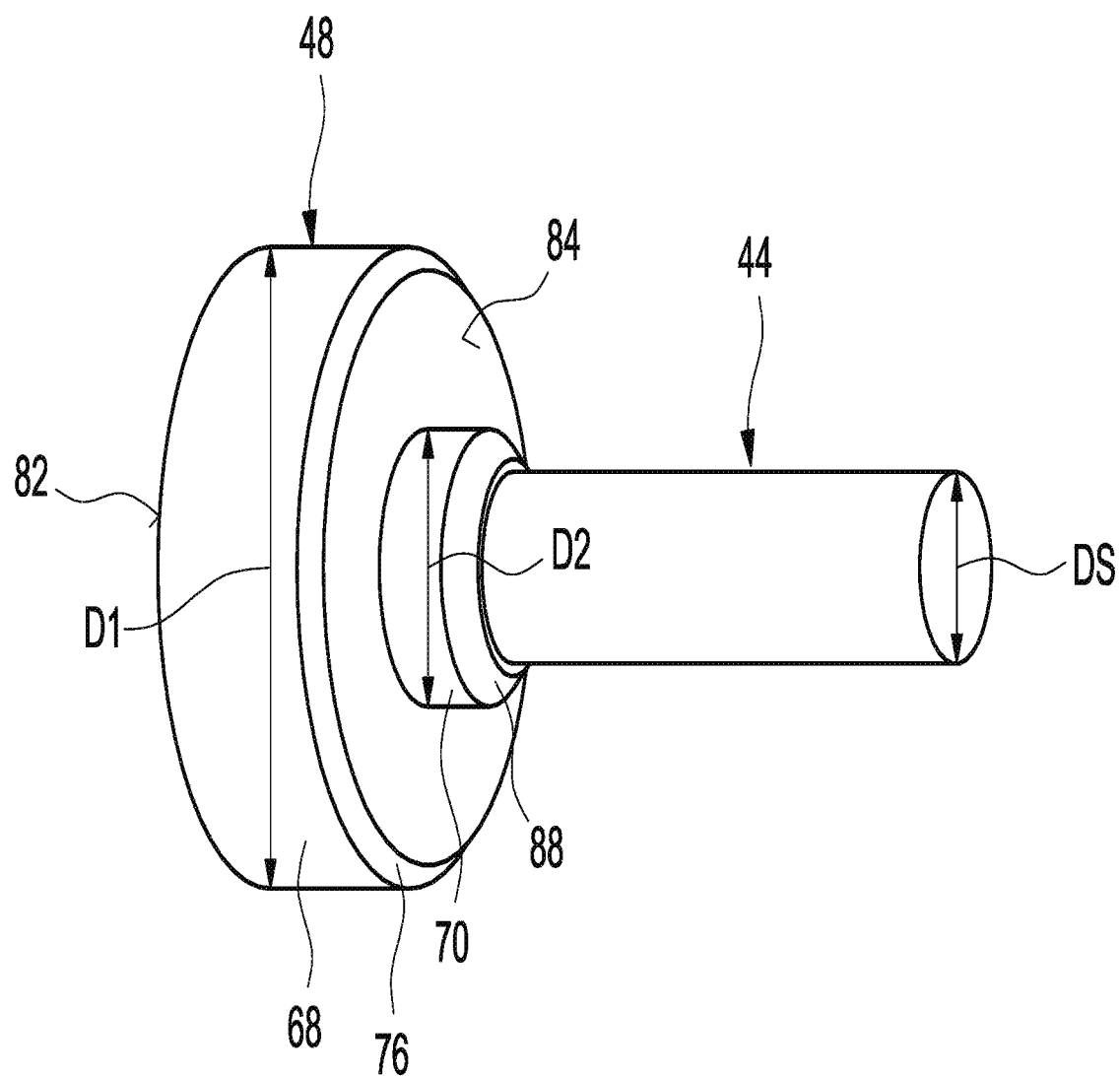
FIG. 5 illustrates a perspective view of a cover element of the pressure control valve according to the invention according to FIG. 4.

FIG. 4 illustrates a hydraulic unit 200 according to a second embodiment of the pressure control valve 10 according to the invention. In this embodiment the cover element 48 is configured integrally in one piece together with the pin 44. The cover element 48 that is integrally configured in one piece with the pin 44 is configured in FIG. 5 in a perspective view. In particular this perspective illustration shows an additional bevel 88 at the cover element 48 which is arranged at the additional section 70 oriented towards the piston 20. The additional bevel 88 simplifies receiving the preload element 64 at the cover element 48.

Due to the fixing of the pin 44 at the cover element 48 pressure spikes can occur in the second volume V2 without impact upon the movement of the pin 44. This means put differently that pressure differentials between the consumer connection A and the tank connection T can occur which however do not cause an acceleration of the pin 44 and thus also do not cause damages to the cover element 48 due to the fixing of the pin 44.

What is claimed is:

1. An electromagnetic pressure control valve, comprising:
an electromagnetic actuator rod configured to position a piston that is received axially movable in a receiving opening of a valve housing along a longitudinal axis of the electromagnetic pressure control valve,
wherein the piston facilitates opening and closing flow connections of the electromagnetic pressure control valve,
wherein the piston receives a pin at a piston face that is oriented away from the electromagnetic actuator rod,
wherein a relative axial movement is enabled between the pin and the piston,
wherein the pin includes a first pin face that is arranged in the valve housing and oriented away from the piston and arranged opposite to a stop,
wherein the pin is axially fixed at the stop so that axial movement of the pin along the longitudinal axis relative to the stop is eliminated in both directions of the longitudinal axis,
wherein the pin is radially supported in the piston
wherein the pin includes a second pin face that is oriented towards the electromagnetic actuator rod and that is loaded with a hydraulic pressure from a consumer connection of the electromagnetic pressure control valve,
wherein the second pin face that is oriented towards the electromagnetic actuator rod defines a hydraulic fluid volume within the piston that is flow connected with the consumer connection through a radial opening in the piston, and
wherein the pin is bonded to the stop.

2. The electromagnetic pressure control valve according to claim 1, wherein the stop is configured as a cover element that closes the receiving opening.

3. The electromagnetic pressure control valve according to claim 2, wherein the cover element includes a bevel at an outer circumferential surface of a shoulder surface of the cover element.

4. The electromagnetic pressure control valve according to claim 2, wherein the cover element includes an additional section that includes an additional bevel.

5. The electromagnetic pressure control valve according to claim 2, wherein the cover element is secured by at least one clamping element at the valve housing.

6. The electromagnetic pressure control valve according to claim 2, wherein a face of the cover element that is oriented away from the piston is configured convex cambered.

7. The electromagnetic pressure control valve according to claim 1, wherein a preload element is arranged between the piston and the stop.

8. The electromagnetic pressure control valve according to claim 7, wherein the preload element envelops the pin.

9. The electromagnetic pressure control valve according to claim 7, wherein the preload element is supported at the stop.

10. The electromagnetic pressure control valve according to claim 1, wherein the pin and the stop are made from a synthetic material.

11. The electromagnetic pressure control valve according to claim 1,
wherein a movement gap is configured between the piston and the pin, and
wherein the movement gap flow connects a first volume configured in the piston with a second volume configured between the piston and the stop.

12. An electromagnetic pressure control valve, comprising:
an electromagnetic actuator configured to position a piston that is received axially movable in a receiving opening of a valve housing of the electromagnetic pressure control valve,
wherein the piston facilitates opening and closing flow connections of the electromagnetic pressure control valve,
wherein the piston receives a pin at a piston face that is oriented away from the electromagnetic actuator,
wherein a relative movement is enabled between the pin and the piston,
wherein the pin includes a pin face that is arranged in the valve housing and oriented away from the piston and arranged opposite to a stop,
wherein the pin is fixed at the stop so that a movement of the pin in a direction towards the stop is eliminated, and
wherein the pin is pressed into a receiving bore hole of the stop.

* * * * *